(No Model.)
A. MEYERHOFF.
THILL SUPPORT.
No. 508,330. Patented Nov. 7, 1893.
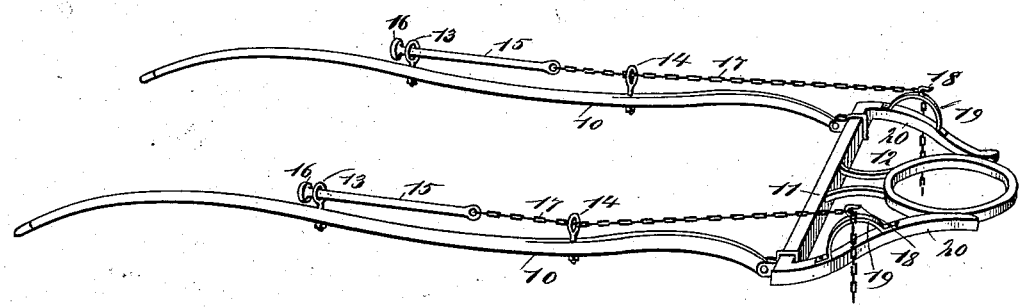
WITNESSES:
H. Walker
A. Lurcott
INVENTOR
A. Meyerhoff
BY
Munn & Co
ATTORNEYS.

UNITED STATES PATENT OFFICE.

ADOLPH MEYERHOFF, OF NEW YORK, N. Y.

THILL-SUPPORT.

SPECIFICATION forming part of Letters Patent No. 508,330, dated November 7, 1893.

Application filed July 1, 1893. Serial No. 479,365. (No model.)

*To all whom it may concern:*

Be it known that I, ADOLPH MEYERHOFF, of the city, county, and State of New York, have invented a new and Improved Thill-Support, of which the following is a full, clear, and exact specification.

My invention relates to improvements in that class of devices which are adapted to sustain a pair of thills or a vehicle pole; and the object of my invention is to produce a very cheap and simple support which may be attached to any vehicle and by which the thills or a pole may be held at any necessary height.

My invention may be used for supporting the thills or a pole at a high elevation so that the vehicle to which the said thills or pole are attached may be conveniently stored, and the invention is also adapted to sustain a pair of thills at about the normal height when in use so as to take the heft from the horse's back and enable the horse to more easily handle the vehicle.

To these ends my invention consists in certain features of construction and combinations of parts, as will be hereinafter described and claimed.

Reference is to be had to the accompanying drawing forming a part of this specification, in which the figure is a perspective view of a pair of thills provided with my invention and secured to the usual shaft supports.

The thills 10 are secured to the cross bar 11 of the running gear 12 in the usual way, and they may be connected to an axle by means of the ordinary coupling, without affecting my invention, as the latter may be applied to any kind of thills or to a pole if desired.

The thills are provided with eye bolts or keepers 13 and 14, in the former of which are sliding rods 15 which have, at their front ends, heads 16, adapted to engage the keepers 13 and thus prevent the rods from slipping out. The rear ends of the slide bolts 15 are secured to chains 17 which extend rearward parallel with the shafts and through the keepers 14, these chains being secured at their rear ends to hooks 18 on the metallic straps 19 which are secured to the braces 20 of the running gear. It will be understood, however, that the hooks 18 may be secured to any convenient portion of the running gear, and as it is well known that the running gear varies greatly in different forms of vehicles, it is evident that the hooks 18 must necessarily be secured in different places in different forms of gear.

It will be observed that when the thills are dropped the heads 16 of the bolts 15 strike the keepers 13 and straighten the chains 17, and the latter, when tight, prevent the thills from dropping any farther. The thills may be held at any desired height, by adjusting the chains 17 on the hooks 18, and the links of the chains should be large enough so that they may be hooked conveniently upon the hooks 18.

It will be understood from the foregoing description that a bolt 15, keepers 13 and 14, and the chain 17 may be applied to the pole of the vehicle as well as to the thills, and with the same effect.

Having thus described my invention, I claim as new, and desire to secure by Letters Patent—

1. The combination, with a vehicle thill or pole, of a keeper thereon, a slide bolt mounted in the keeper and having a head at its front end to engage the keeper, and a chain secured to the rear end of the slide bolt and adapted to be fastened to the running gear of the vehicle, substantially as described.

2. The combination, with a vehicle pole or thill, of a keeper on the pole or thill, a hook secured to the adjacent running gear, a slide bolt mounted in the keeper and having a head at its front end to engage the keeper, and a chain secured to the rear end of the bolt and adapted to engage the hook, substantially as described.

3. The combination, with a vehicle thill or pole, of a pair of keepers on the pole or thill, a slide bolt held in the forward keeper, having a head at its front end to engage the keeper, a chain secured to the rear end of the bolt and running through the rear keeper, and a hook on the adjacent running gear to engage the chain, substantially as described.

ADOLPH MEYERHOFF.

Witnesses:
EDWARD F. PLESCHINGER,
GUSTAV LAHR.